(12) United States Patent
Golding

(10) Patent No.: US 11,651,247 B2
(45) Date of Patent: May 16, 2023

(54) METHOD FOR VERIFYING LACK OF BIAS OF DEEP LEARNING AI SYSTEMS

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

( * ) Notice: Subject to any disclaimer, the term of this patent is extended or adjusted under 35 U.S.C. 154(b) by 1048 days.

(21) Appl. No.: 16/360,550

(22) Filed: Mar. 21, 2019

(65) Prior Publication Data
US 2020/0302309 A1 Sep. 24, 2020

(51) Int. Cl.
G06Q 30/00 (2023.01)
G06N 5/04 (2023.01)
G06N 20/00 (2019.01)
G06Q 40/03 (2023.01)

(52) U.S. Cl.
CPC .............. *G06N 5/04* (2013.01); *G06N 20/00* (2019.01); *G06Q 40/03* (2023.01)

(58) Field of Classification Search
None
See application file for complete search history.

(56) References Cited

U.S. PATENT DOCUMENTS

| | | | |
|---|---|---|---|
| 10,841,372 B1* | 11/2020 | Ram | H04L 65/80 |
| 2016/0012465 A1* | 1/2016 | Sharp | G06Q 20/321 |
| | | | 705/14.17 |
| 2016/0225073 A1* | 8/2016 | Xiao | G06Q 40/03 |
| 2017/0213280 A1* | 7/2017 | Kaznady | G06Q 40/03 |
| 2019/0114706 A1* | 4/2019 | Bell | H04L 9/0825 |
| 2019/0164221 A1* | 5/2019 | Hill | G06Q 20/36 |
| 2019/0354611 A1* | 11/2019 | Snow | G06F 9/45558 |

* cited by examiner

*Primary Examiner* — Matthew T Sittner
(74) *Attorney, Agent, or Firm* — Ferguson Braswell Fraser Kubasta PC

(57) ABSTRACT

A method including receiving an unknown vector including a data structure populated with unknown features describing a user. The method also includes executing a primary machine learning model (MLM) trained using a prediction data set to predict a score representing a prediction regarding the user. The prediction data set includes the unknown vector stripped of a biased data set including markers set that directly indicate that the user belongs to a cohort against which bias is to be avoided. The method also includes executing a supervisory MLM trained using the prediction data set to predict whether the user belongs to the cohort. The method also includes performing, using an industry tool, a computer-implemented action using the score after executing the primary MLM and the supervisory MLM.

19 Claims, 9 Drawing Sheets

METHOD FOR VERIFYING LACK OF BIAS OF DEEP LEARNING AI SYSTEMS

RELATED APPLICATIONS

This application is related to U.S. application Ser. No. 16/360,368, filed on Mar. 21, 2019, and entitled "METHOD FOR TRACKING LACK OF BIAS OF DEEP LEARNING AI SYSTEMS".

BACKGROUND

Artificial intelligence (AI) systems are increasingly used to perform business transactions, particularly in online business systems, such as enterprise systems. An enterprise system is a combination of hardware and software that supports network-centric business processes, information flows, reporting, and data analytics in complex organizations.

AI is the ability of a computer to perform tasks commonly associated with intelligent beings, such as to draw inferences from data. AI is often implemented in the form of machine learning. Machine learning is the computer science study of algorithms and statistical methods that computer systems use to progressively improve their performance on a specific task. Machine learning algorithms, sometimes referred to as machine learning models (MLMs), build a mathematical model of sample data, known as training data, in order to make predictions or decisions without being explicitly programmed to perform the specific task.

One kind of machine learning model is known as a deep learning model, such as but not limited to an artificial neural network. A known issue with deep learning models is that it is impossible for a human to know how a deep learning model arrives at a prediction or decision with respect to performing the specific task. In other words, a deep learning AI MLM may be thought of as a "black box," to which input may be provided to achieve a desired output. While the output may be independently verified, to within a measurable degree of statistical probability, as being accurate or inaccurate, understanding how the deep learning MLM used the input to arrive at the output is more complicated.

SUMMARY

In general, in one aspect, one or more embodiments relate to a method. The method includes receiving an unknown vector including a data structure populated with unknown features describing a user. The method also includes executing a primary machine learning model (MLM) trained using a prediction data set to predict a score representing a prediction regarding the user. The prediction data set includes the unknown vector stripped of a biased data set including markers set that directly indicate that the user belongs to a cohort against which bias is to be avoided. The method also includes executing a supervisory MLM trained using the prediction data set to predict whether the user belongs to the cohort. The method also includes performing, using an industry tool, a computer-implemented action using the score after executing the primary MLM and the supervisory MLM.

One or more embodiments relate to a system. The system includes a repository storing training data and a biased data set. The training data includes features arranged as a first vector for input into a primary machine learning model (MLM) and a supervisory MLM, the features corresponding to information describing users. The biased data set includes a subset of the features belonging to a cohort against which bias is to be avoided. The subset of the features including markers useable by the primary MLM to make a prediction of credit worthiness, of a user of the users who belongs to the cohort, on a basis of bias against the cohort. The system also includes a stripping utility including functionality for stripping the biased data set from the training data to form a first modified training data. The primary MLM is trained with the first modified training data to predict credit worthiness scores of the users. The supervisory MLM is trained with the first modified training data to predict which of the users belongs to the cohort.

One or more embodiments also include another method. The method includes receiving training data. The training data includes features arranged as a first vector for input into a primary machine learning model (MLM) and a supervisory MLM, the features corresponding to information describing users. The method also includes stripping the training data of overt markers and known proxy markers, the overt markers and known proxy markers corresponding to a cohort against which bias is to be avoided, and forming a first modified training data including a subset of the features. The method also includes training the primary MLM with the first modified training data to predict credit worthiness scores of the users. The method also includes training the supervisory MLM with the first modified training data to predict which of the users belong to the cohort. The method also includes receiving a prediction data set from which the overt markers and known proxy markers have been stripped, the prediction data set including a second vector including sample data related to a user in the users. The method also includes executing the supervisory MLM using the prediction data set to predict whether the user belongs to the cohort. The method also includes executing the primary MLM using the prediction data set to predict a credit worthiness score of the user. The method also includes, responsive to the supervisory MLM failing to converge on the cohort, inputting the credit worthiness score into a finance tool configured to determine whether a loan offer should be extended to the user. The loan offer including a widget operable by the user using a computer. The method also includes, responsive to the supervisory MLM converging on the cohort, determining whether the primary MLM is biased against the cohort. The method also includes, responsive to the primary MLM being non-biased against the cohort, inputting the credit worthiness score into the finance tool. The method also includes, responsive to the primary MLM being biased against the cohort, The method also includes remediating the primary MLM to form a remediated primary MLM. The method also includes executing the remediated primary MLM to determine a new credit worthiness score for the user. The method also includes inputting the new credit worthiness score into the finance tool.

Other aspects of the invention will be apparent from the following description and the appended claims.

DETAILED DESCRIPTION

Figure 1:
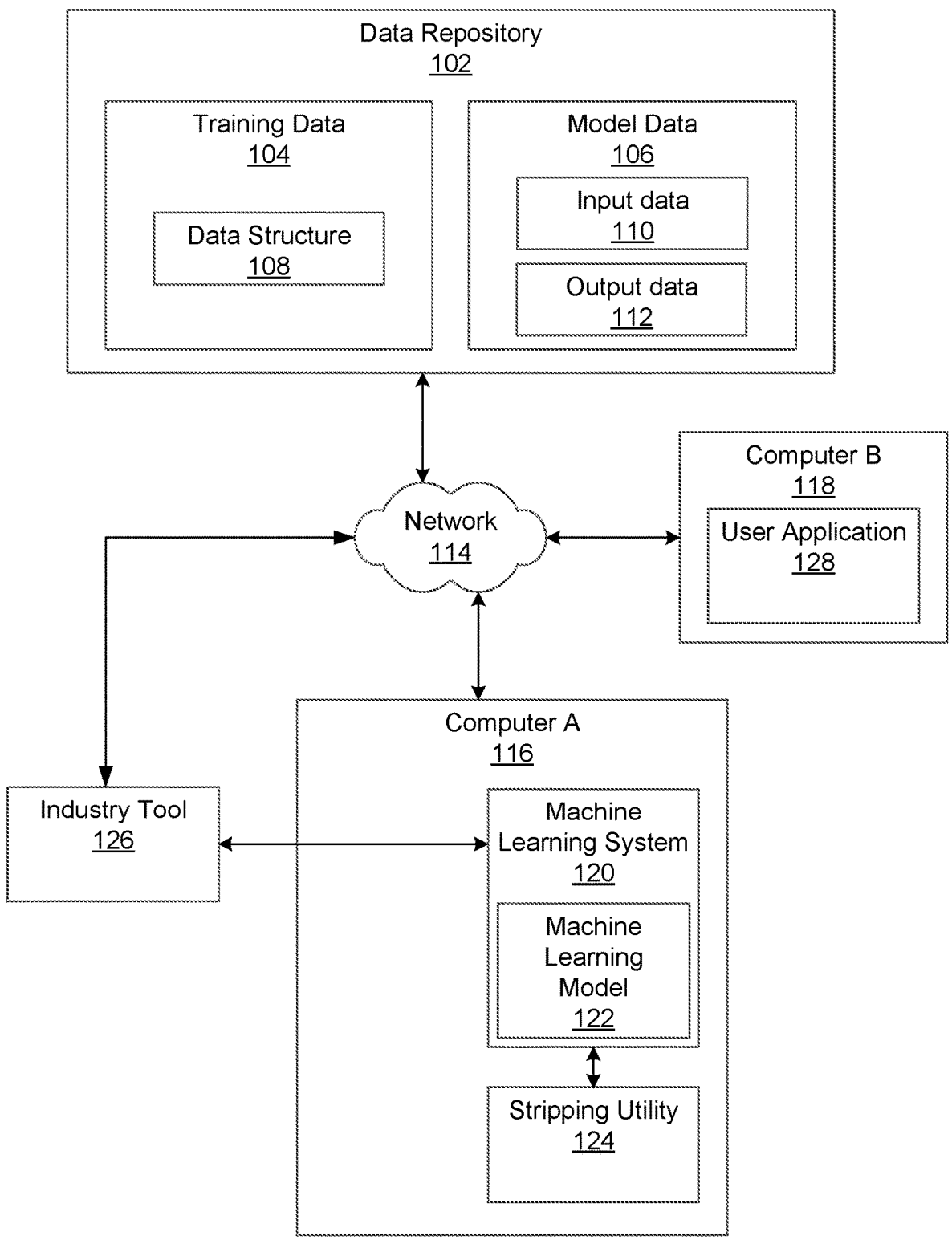
FIG. 1 and FIG. 2 depict schematic system diagrams, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Artificial Intelligence (AI) systems, particularly in the form of machine learning, are powerful computer tools for quickly arriving at determinations that have an acceptable degree of accuracy. For example, in the financial industry, AI systems rapidly determine an acceptably accurate probability whether a loan applicant will default if a loan is made to the application, and such determination helps inform the lender's final decision to extend a loan to the applicant. Similarly, in medical research, AI systems may be able to find correlations which are invisible to a user in a vast pool of medical data, and those correlations help inform a principal investigator regarding what might be causes for a medical condition.

The one or more embodiments described herein present a method and system for ensuring and verifying that deep learning AI systems do not output a result which has been arrived at on the basis of consideration of an impermissible cohort. Thus, for example, the one or more embodiments present a method and a system for verifying that an AI system did not use race, or other legally excluded consideration, as a factor in determining a probability of loan default for a loan applicant. The one or more embodiments may also provide a method and a system for verifying that another AI system did not use an excluded consideration as a factor in determining a cause for a medical condition.

In particular, the one or more embodiments use a system of deep learning machine learning models (MLMs) to confirm that the primary, decision-making MLM (i.e., the AI responsible for making the primary prediction) did not use the impermissible cohort in an impermissible manner in deriving its output. The one or more embodiments also provide for a means for characterizing the cause of such bias when the primary MLM did predict the output on the basis of the cohort. The one or more embodiments also provide for a way to eliminate such bias from future predictions of the primary MLM.

Attention is now turned to the figures. In particular, FIG. 1 depicts a schematic diagram, in accordance with one or more embodiments. The system shown in FIG. 1 may be implemented by one or more computers in a possibly distributed computing environment. Thus, the system shown in FIG. 1 may be implemented, for example, by the computing system shown in FIG. 14A and FIG. 14B.

A data repository (102) includes training data (104) and model data (106). The training data (104) is used to train one or more machine learning models of a machine learning system, such as those described herein. For example, training data may be a data structure (108), such as a "vector" which contains a series of data values (called "values" or "markers") within data categories (called "features").

In a finance application, the training data (104) may be a vector of features for a large number of "users" (individuals described by the data values), with the features describing information about the users. The information describes the loan history of the user, such as whether the users defaulted on one or more prior loans. In a medical research application, the training data may be a vector of features for a large number of users, with the features relating to medical information about the users, including information describing the user's medical condition of interest.

The model data (106) is data provided to, or used by, a machine learning model (MLM) during use. Thus, after an MLM has been trained, the input data (110) is the data regarding the unknown user or users that is provided to the MLM. The output data (112) is the MLM's prediction or calculation that is output as a result of feeding the input data (100) to the MLM and executing the MLM.

In a finance application, the output data (112) may be a probability that the unknown user or users will default on a loan if a loan is accepted by the unknown user or users. In a medical research application, the output data (112) may be a correlation between features, so that the principal researcher can readily see that feature X is correlated to feature Y in some hidden way.

In one or more embodiments, the data repository (102) may be in communication with one or more computers over a network. For example, the data repository (102) may be communicated over network (114) with computer A (116) and computer B (118). An example of a repository, network, and a computer is provided with respect to FIG. 14A and FIG. 14B.

In one or more embodiments, computer A (116) is the computer upon which a machine learning system (120) is executed. The machine learning system (120) may include one or more machine learning models, such as machine learning model (122). In one or more embodiments, the MLMs of the machine learning system (120) are trained using the training data (104), receive as input the input data (110) of the model data (106), and generate as output the output data (112) of the model data (106).

In one or more embodiments, the machine learning system (120) is configured or programmed to determine whether an MLM of the machine learning system (120) used unacceptable bias to generate the output data (112). Details regarding how the machine learning system (120) is so configured or programmed is described below and, at least in some aspects, with respect to FIG. 3A through FIG. 11. Additional components of the machine learning system (120) may be shown with respect to FIG. 2 and described below.

Computer A (116) may also include a stripping utility (124). In one or more embodiments, the stripping utility is software having functionality, when executed by the computer A (116), to remove selected markers or features from the training data (104) or the input data (110) that are known or suspected to lead to undesirable bias. The functionality may take the form of a computer useable program code that deletes the indicated features from a vector or deletes markers from a feature. For example, the stripping utility (124) may contain functionality to strip information relating to the race, religion, or ethnicity of a loan applicant from the training data (104) or the input data (110), or to strip proxies. A proxy is data which may serve as a hidden indicator of the cohort; for example, the fact that a user listens to a particular genre of music could be a proxy for the fact that the user belongs to an ethnic group that is an impermissible cohort.

In another example, the stripping utility (124) may contain functionality to strip information from the training data (104) or the model data (106) that relates to a pathology pathway that is to be excluded from a medical research study. In one or more embodiments, the stripping utility (124) may be programmed to provide new inputs to the MLM (122) that instruct the MLM (122) to ignore information in the training data (104) or the model data (106). In one or more embodiments, the stripping utility (124) may be programmed to adjust weights assigned to the training data (104) or the model data (106) such that the importance of such data is reduced or eliminated with respect to calculating an output.

In one or more embodiments, the machine learning system (120) may be in communication with an industry tool (126). The industry tool (126) is software, hardware, or a combination thereof which is programmed to perform some other task of interest to the user, based on input from the machine learning system (120). For example, the industry tool (126) may be an enterprise system or may be a web-based software program. The industry tool (126) may be part of computer A (116), or may be executed by a system which is external to computer A (116).

In a more specific example, the industry tool (126) may be a loan determination system. In this case, the loan determination system takes as input the output of the machine learning system (120). For example, the output of the machine learning system (120) may be the probability that a given user will default on a loan if a loan offer is extended to the user and accepted by the user. The probability may be the only input to the industry tool (126), or may be one of many forms of input provided to the industry tool (126). Nevertheless, the industry tool is programmed to make the final determination of whether to extend a loan offer to the user applying for the loan, and at what interest rate.

In another specific example, the industry tool (126) may be a research tool which calculates some other result based on the correlation discovered by the machine learning system (120). Thus, the one or more embodiments are not necessarily limited only to financial applications.

Other components may be present in the system shown in FIG. 1. For example, computer B (118) may be a remote computer system that includes a user application (128). In one or more embodiments, the user application (128) is a software, hardware, or a combination thereof having functionality such that, when executed, allows the user to interact with the machine learning system (120) on computer A (116) via the network (114).

For example, the user application (128) may be web-based software hosted on computer A (116) which allows a user to input user data for a loan application. The machine learning system (120) then takes the user data as input and, among other data (such as data retrieved from a credit report on the user) calculates a probability that the user (the loan applicant) will default if a loan is extended to the user. The user application (128) could also be software directly installed on or otherwise instantiated on the computer B (188) which serves the same function and communicates retrieved data to the machine learning system (120) via the network (114).

In another example, the user application (128) could be a database or spreadsheet program which allows a principal investigator of a medical research team to input medical data regarding the study in question. In this case, the medical data is input to the machine learning system (120) via the network (114). Such software, again, may be web-based and hosted on computer A (116) (or some other remote computer) or may be locally instantiated on computer B (118).

Figure 3A:
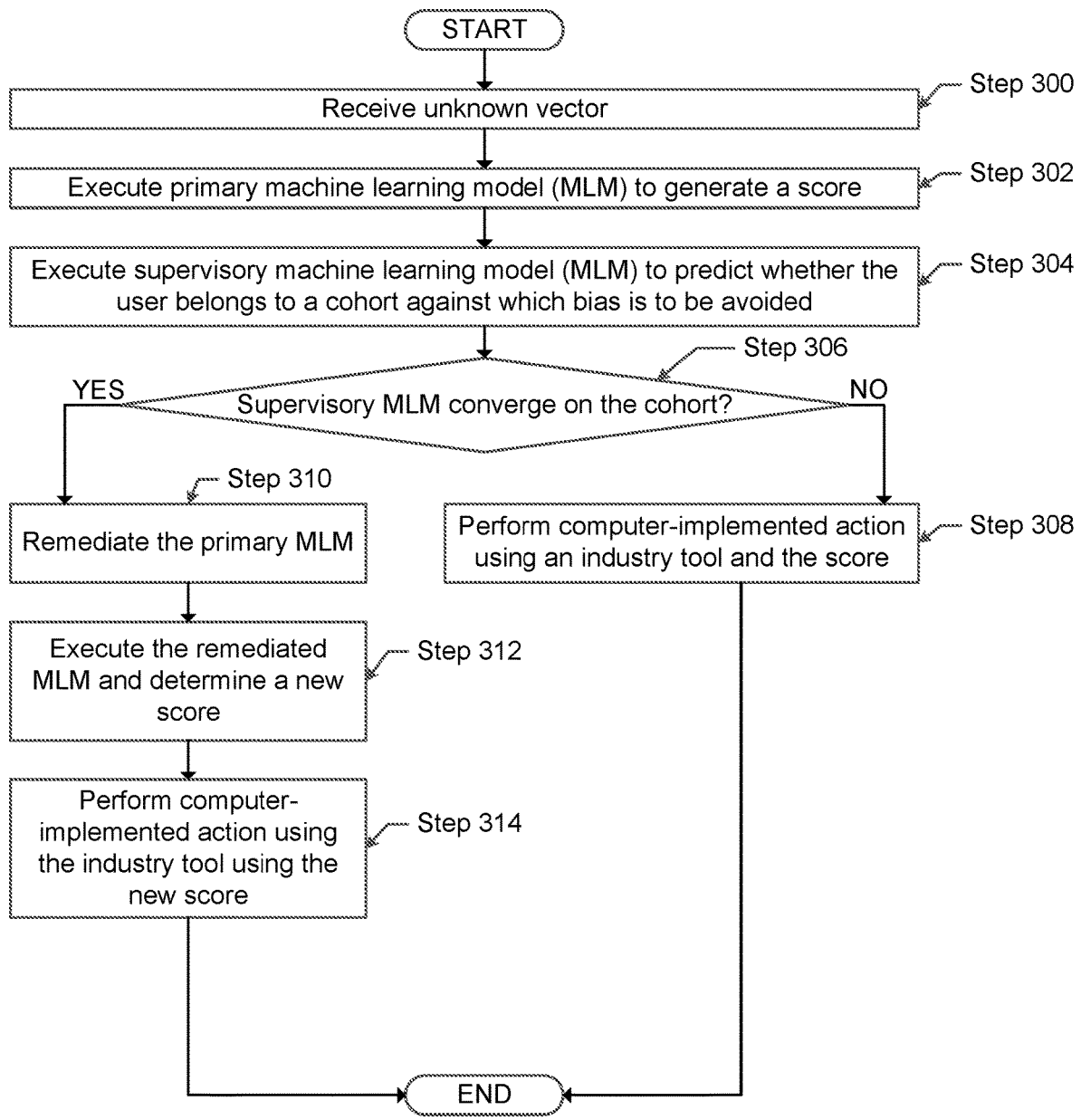
FIG. 3A and FIG. 3B depict flowchart diagrams, in accordance with one or more embodiments.
Figure 3B:
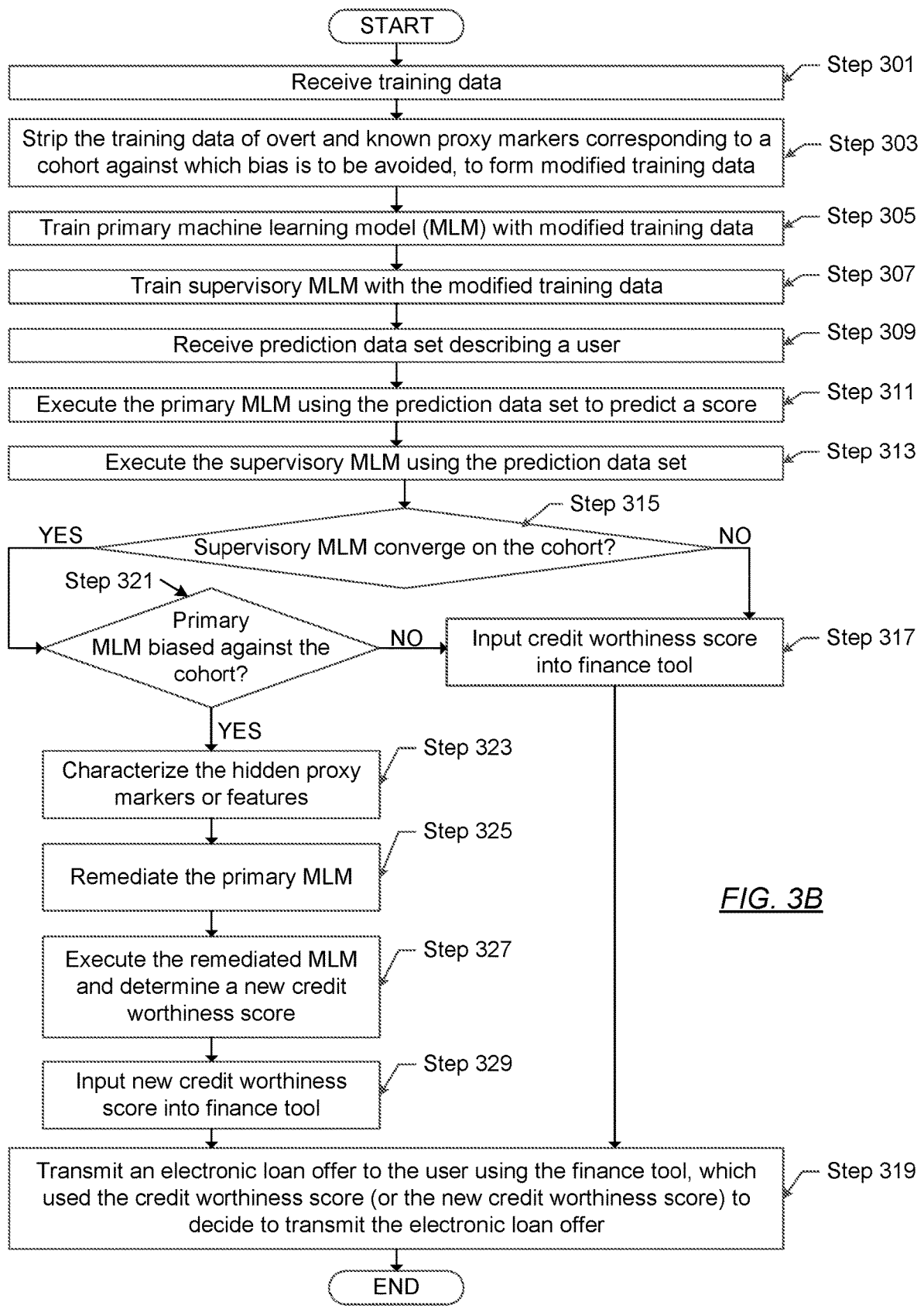

In one or more embodiments, implementation details regarding the operation of the machine learning system (120) are described with respect to and shown by FIG. 3A and FIG. 3B. Briefly, the machine learning system (120) is configured to perform both the primary machine learning model function (i.e., to calculate a probability of loan default or to determine some other correlation among the input data (110)), and to verify that the primary machine learning model function is free of any undesirable bias when making that determination.

Note that the examples described with respect to FIG. 1 have been presented with respect to a finance application and a medical research application. However, the one or more embodiments are not necessarily limited to such applications. The one or more embodiments, both with respect to FIG. 1 and with respect to the remaining figures, may be used with respect to any machine learning system in which a machine learning model is to perform a calculation without undesirable bias. The one or more embodiments may also be used to identify specific features or markers that most influenced the resulting output data (112). In one or more embodiments, details regarding the operation and functionality of the machine learning model system (120) are described with respect to FIG. 3A through FIG. 11.

Figure 2:
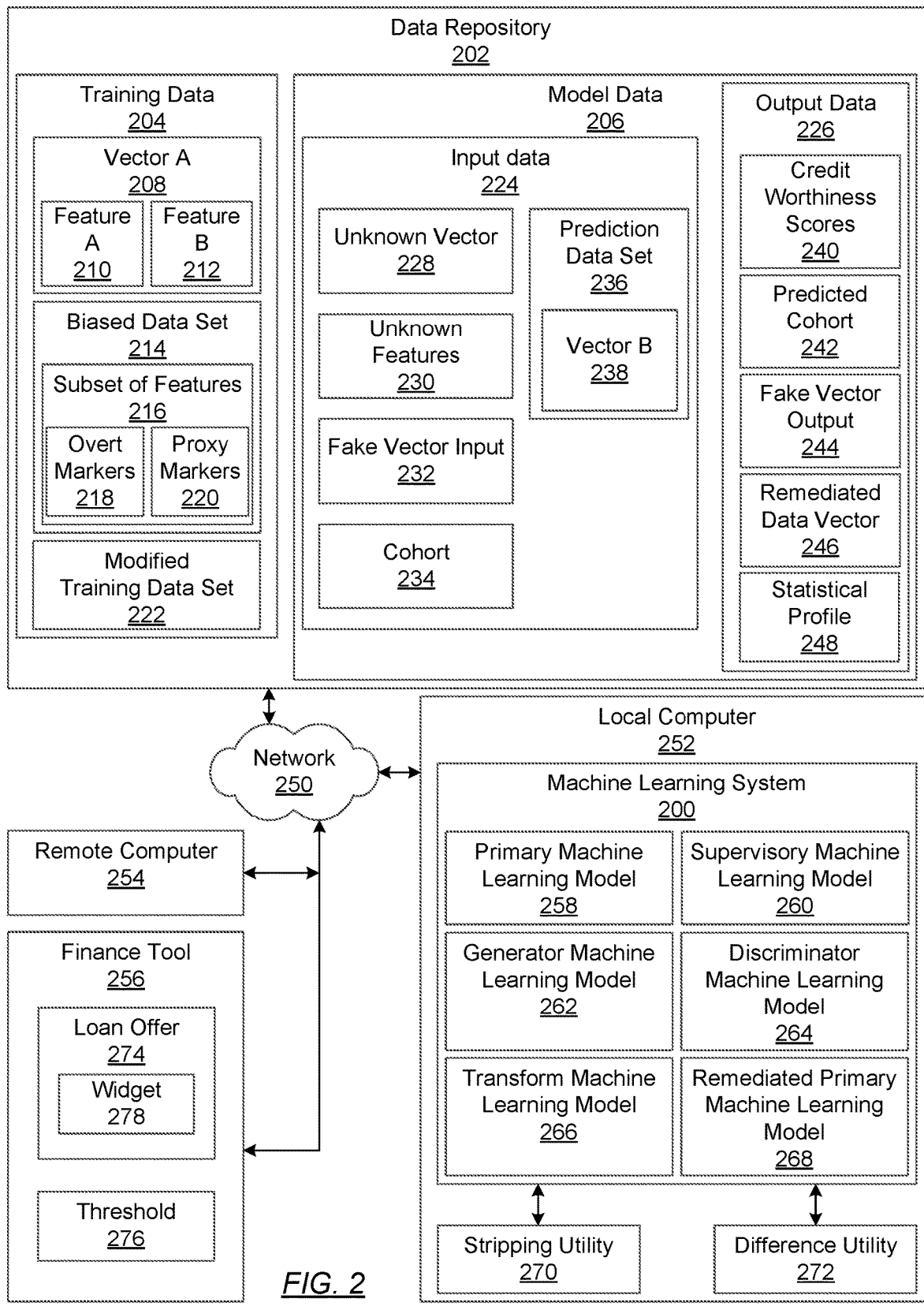

FIG. 2 depicts a schematic diagram, in accordance with one or more embodiments. The system shown in FIG. 2 may be implemented by one or more computers in a possibly distributed computing environment or other computer environment. Thus, the system shown in FIG. 2 may be implemented by the computing system and network shown in FIG. 14A and FIG. 14B.

In one or more embodiments, a data repository (202) includes training data (204) and model data (206), which may be examples of the data repository (102), training data (104), and model data (106) of FIG. 1. The training data (204) is used to train one or more machine learning models of a machine learning system, such as machine learning model system (120) of FIG. 1 or machine learning system (200) of FIG. 2. For example, the training data (204) may be a vector A (208). The vector A (208) is an example of the data structure (108) in FIG. 1. The vector A (208) includes one or more features, such as feature A (210) and feature B (212). Each feature may contain a corresponding data value or data values (called a "value" or a "marker").

In one or more embodiments, the training data (204) also includes a biased data set (214). The biased data set (214) is a subset of features (216) among all of the features in vector A (208). In particular, the subset of features (216) includes overt markers (218) and proxy markers (220), or other features or markers, which directly or are known to indirectly indicate that a user belongs to a cohort against which bias is to be avoided. For example, the biased data set (214) may include the overt marker (218) that a user is a member of a gender, an ethnic racial, or a religious group or may include the proxy marker that implies that the user is the member of the gender, an ethnic racial, or a religious group. In either case, the overt markers (218) and proxy markers (220) directly or indirectly indicate that the user belong to a cohort against which bias is to be avoided.

As explained further below, the subset of the features (216) are to be stripped from the features in the vector A (208). Therefore, the training data includes modified training data set (222). The modified training data set (222) is the set of features in the vector A (208), but stripped of the subset of features (216). Thus, all overt markers (218) and proxy markers (220) are not included in the modified training data set (222).

Attention is now turned to the model data (206) in the data repository (202). Again, the model data (206) is an example of the model data (106) described with respect to FIG. 1. Thus, the model data includes input data (224), which is an example of input data (110) of FIG. 1, and output data (226), which is an example of output data (112) of FIG. 1.

In one or more embodiments, the input data (224) is data which is input into one or more machine learning models (MLMs) in order to achieve an output. Therefore, in one or more embodiments, the training data (204) may be, but is not necessarily, considered part of the input data (224).

However, in most cases, the input data (224) refers to other types of input data. For example, the input data (224) may be an unknown vector (228) which contains unknown features (230) containing markers describing an unknown user for whom a primary MLM is to draw a prediction. In a specific example, the unknown vector may be information in a credit report, possibly together with other information drawn from a loan application, describing a person who is applying for a loan. Because the primary MLM (258), below, has never calculated a credit worthiness score for this user, the vector describing this user is referred to as the "unknown vector," the features in the unknown vector are "unknown features," and the markers for the unknown features are "unknown markers." Stated differently, the unknown vector (228) with unknown features (230) and unknown markers are not "unknown" in the sense that the vector, features, and markers are not defined or are invisible to a programmer. Rather, the unknown vector (228) and unknown features (230) simply relate to a vector, with features and markers, that have not yet been subject to analysis by any of the MLMs in the machine learning system (200).

In one or more embodiments, the input data may also include fake vector input (232). The fake vector input (232) may be a vector which contains fake markers or a mixture of fake and real markers. The fake vector input is used in the machine learning system (200) to identify hidden proxy markers within a modified training data set (222), as described further with respect to FIG. 3B. The fake vector output (244) may also be used to remediate a primary MLM, as also described with respect to FIG. 3B.

In one or more embodiments, the input data (224) may also include a cohort (234). The cohort is a data structure containing data values which describe a group against which bias is to be avoided. For example, a cohort may be a data structure include data values which describe or imply a racial ethnicity (such as for a financial application) or which describe a medical condition that is to be excluded in a study (such as for a medical research application). In any case, the primary MLM in the machine learning system (200) should not draw inferences based on the cohort (234), because bias against the cohort (234) is to be avoided.

In one or more embodiments, the input data (224) also includes a prediction data set (236), which is defined by vector B (238). The prediction data set (240) may be the unknown vector (228), but may also be some other test prediction data set. The vector B (238) of prediction data set (236) is stripped of any biased data, including any overt markers and known proxy markers, and thus may also be modified training data set (222).

Attention is now turned to the output data (226). In one or more embodiments, the output data (226) is data which is output from one or more machine learning models (MLMs). In some cases, the output data (226) is provided as input to another MLM in the machine learning system (200). In other cases, the output data (226) is provided to an industry tool, such as a finance tool (256). In still other cases, the output data (226) is stored or displayed, possibly for review by a programmer. In yet other cases, the output data (226) may include the actual model data (i.e., the parameters or weights that the model has learned).

The output data may include credit worthiness scores (240), a predicted cohort (242), a fake vector output (244), a remediated data vector (246), and a statistical profile (248). In one or more embodiments, the credit worthiness scores (240) are the output of the primary machine learning model (258), and may describe a probability that a given user will default if extended a loan. The credit worthiness scores (240) may be output by the primary MLM (258) in the manner described with respect to FIG. 3A and FIG. 3B.

In one or more embodiments, the predicted cohort (242) is the cohort to which a user is predicted to belong, according to the determination of an MLM, such as a supervisory MLM. (260) Generation and use of the predicted cohort (242) are described further with respect to FIG. 3B.

The remediated data vector (246) is a data structure containing features and markers from which all hidden proxy markers have been stripped, or otherwise adjusted. As used herein, a data vector is "adjusted" if the data contained therein has been weighted to disfavor or eliminate certain vector features or has been changed by the application of a different vector. In other words, after operation of the machine learning system (200) to identify hidden proxy markers which were used by the primary MLM (258) to determine an output which is biased against the cohort (234), as described with respect to FIG. 3B, the unknown vector (228) or the prediction data set (236) may be stripped of the hidden proxy features or markers, or otherwise adjusted as described above, in order to form remediated data vector (246). The remediated data vector (246) may then become a new input into the primary MLM (258) to generate a revised prediction, such as a revised credit worthiness score, which the primary MLM (258) determines in a manner which is substantially free from bias against the cohort. The term "substantially" means to within a statistical margin of error deemed acceptable to one of ordinary skill.

In one or more embodiments, the statistical profile (248) is a data structure containing data, derived according to statistical methods, that characterizes potential biases of the primary MLM (258) against the cohort (234). As described with respect to FIG. 3B, hidden proxy markers may be discovered by using opposed MLMs to identify a difference in the vectors, known as a residual vector. By sampling the residual vector in a vector space of the vector A (208), a probability distribution function may be constructed that corresponds to probabilities of certain features in the residual vector being significant in determining hidden bias in the primary MLM (258). For example, a meaningful probability distribution may arise around features related to eating habits of the applicants. This fact would indicate that features related to eating habits are a potential contributory factor in enabling the primary MLM (258) to exhibit unacceptable bias against the cohort (234). Thus, the probability distribution function is the statistical profile (248) that characterizes potential biases of the primary MLM (258) against the cohort (234).

Attention is now turned to the other components of FIG. 2. The data repository (202) communicates via a network (250) with a local computer (252), a remote computer (254) and a finance tool (256). Each of these components is described in turn.

In one or more embodiments, the local computer (252) is described as "local" because the local computer (252) is operated by the company or organization that uses the machine learning system (200) to detect hidden bias against a cohort (234) in the operation of a primary MLM (258). However, the local computer (252) may, itself, be a distributed computing system over another network, e.g., a local area network or a wide area network, such as the Internet, and may also be interconnected via the network (250). Nevertheless, the local computer (252) is responsible for executing the various components of the machine learning system (200) and other executable software useful in the detection and elimination of undesirable bias against the cohort (234) in the operation of the primary MLM (258).

To that end, in addition to the primary MLM (258), the machine learning system (200) also includes a supervisory MLM (260), a generator MLM (262), a discriminator MLM (264), a transform MLM (266), and a remediated primary MLM (268). In one or more embodiments, the primary MLM (258) is the MLM that is trained to calculate the prediction of interest. For example, in the finance application example, the primary MLM is programmed to receive an unknown vector (228) or prediction data set (236) as input and to calculate credit worthiness scores (240) as output. The primary MLM (258) is a deep learning MLM, such as but not limited to a neural network. Operation of the primary MLM (258) is described with respect to FIG. 3A and FIG. 3B.

In addition, the machine learning system (200) includes the supervisory MLM. In one or more embodiments, the supervisory MLM (260) is trained to predict whether a given user described by the unknown vector (228) or the prediction data set (236) belongs to the cohort (234). In other words, the supervisory MLM (260) is trained to predict, based on data that has already been stripped of the overt markers (218) and the proxy markers (220) indicative of bias against the cohort (234), whether the user or users belong to the cohort (234). If the supervisory MLM (260) converges on the cohort (242) (i.e., by outputting the cohort (242)), then the programmer may conclude that some hidden bias may exist against the user or users when the primary MLM (258) output the credit worthiness scores (240) for that user. Operation of the supervisory MLM (260) is described further with respect to FIG. 3A and FIG. 3B.

The machine learning system (200) also includes the generator MLM (262) and the discriminator MLM (264), which operate in opposition to each other. In one or more embodiments, the generator MLM (262) is trained to predict a fake vector output (244) which can trick the discriminator MLM (264) into outputting a prediction that the fake vector output (244) is actually real. In turn, in one or more embodiments, the discriminator MLM (264) is trained to predict whether the fake vector output (244) of the generator MLM (262) is actually fake. The opposition of generator MLM (262) and the discriminator MLM (264) to each other allows the creation of the remediated data vector (242) and the statistical profile (248), as described with respect to FIG. 3B.

Continuing with the description of FIG. 2, the machine learning system (200) also includes the transform MLM (266). In one or more embodiments, the transform MLM (266) is trained to transform the unknown vector (228) or the prediction data set (236) into the remediated data vector (246). Again, the remediated data vector (246) has been stripped of all hidden proxy markers which might cause the primary MLM (258) to predict the output of the primary MLM (258) based on the user's membership in the cohort (234). Operation of the transform MLM (266) is described with respect to FIG. 3B.

In turn, the remediated data vector (246) may then be used to retrain the primary MLM (258) so that the primary MLM no longer generates predictions based on the membership of a user to the cohort (234). The result of retraining the primary MLM is the remediated primary MLM (268). In one or more embodiments, the remediated primary MLM (268) then makes future predictions without bias against a user on account of the user's membership in the cohort (234). The operation of the remediated primary MLM (268) is described further with respect to FIG. 3B.

The local computer (252) may also execute other software useful to the machine learning system (200). Examples of such software may include a stripping utility (270) and a difference utility (272). In one or more embodiments, the stripping utility (270) is software programmed to strip data from a vector, such as any of those described above. The data may be stripped by deleting a feature from a vector, deleting a marker from a feature, or any combination thereof. Deleted data may be discarded, or in some embodiments may be stored elsewhere for purposes of later study. Operation of the stripping utility (270) is described with respect to FIG. 3B.

In one or more embodiments, the difference utility (272) is software programmed to compare two vectors. More specifically, the difference utility (272) may be programmed to identify differences between two vectors. The differences, and the operation of the difference utility (272), are described with respect to FIG. 3B.

The local computer (252) may contain additional MLMs or other types of utilities. Thus, the examples described with respect to FIG. 2 are not necessarily limited to those described above. An example of the system described with respect to FIG. 2 is presented with respect to FIG. 14.

In another example, the local computer (252) may also execute the finance tool (256). However, the finance tool (256) may be executed by a remote computer, possibly maintained by an entity different than the entity which operates the local computer (252). Therefore, the finance tool (256) is shown in FIG. 2 as being external to the local computer (252), though the finance tool (256) could be moved inside the local computer (252).

In one or more embodiments, the finance tool (256) is software programmed to determine whether to extend a loan offer (274) to an applicant when the finance tool (256) receives a loan application from the remote computer (254), which is operated by the user. The data entered for the loan application may be entered via a program instantiated on the remote computer (254) or via a web site hosted by the local computer (252) or by some other computer not shown.

In response, the finance tool (256) may call the primary MLM (258) of the machine learning system (200) to predict the credit worthiness scores (240) for the user, and then use the credit worthiness scores (240), along with other information in the loan application, to determine whether to transmit the loan offer (274) to the remote computer (254). In one or more embodiments, the finance tool (256) includes functionality or is programmed to transmit the loan offer (274) to the remote computer (254) (and hence the applicant) when the credit worthiness score (as possibly modified by further data processing performed by the finance tool (256)) exceeds a threshold (276). In other words, the threshold (276) is a number, chosen at the discretion of a user or possibly a programmer, which reflects a minimum credit worthiness score necessary to cause the finance tool (274) to transmit the loan offer (274) to the remote computer (254).

The loan offer (274) contains a widget (278). The widget is a script or other software element which, when manipulated by a computer (e.g. remote computer (254)) indicates to the finance tool (256) that the applicant has accepted or declined the loan offer. The widget may take the form of a button, a dialog box, a drop down menu, or any other convenient computerized tool for receiving data input.

Attention is now turned to FIG. 3A through FIG. 11. FIG. 3A is a method for taking a computerized action on the basis of a prediction output by a primary MLM while ensuring that the primary MLM calculated the prediction without undesirable bias against a cohort in accordance with one or more embodiments. FIG. 3B is an expanded method relative to FIG. 3A, and also includes the further actions of remediating the primary MLM when a supervisory MLM detects that the primary MLM calculated the prediction based on an undesirable bias against the cohort in accordance with one or more embodiments.

FIG. 4 through FIG. 11 provide explanatory examples of some of the steps described with respect to the method of FIG. 3A and the method of FIG. 3B. Thus, the descriptions of FIG. 4 through FIG. 11 are interwoven with the description of the method of FIG. 3A and FIG. 3B. Reference numerals in common among FIG. 4 through FIG. 11 refer to similar objects and have similar descriptions.

Either method FIG. 3A or FIG. 3B may be implemented using one or more computers, possibly over a network. Examples of the one or more computers and the network are described with respect to FIG. 14A and FIG. 14B.

As indicated above, FIG. 3A is a method for taking a computerized action on the basis of a prediction output by a primary MLM while ensuring that the primary MLM calculated the prediction without undesirable bias against a cohort. The method shown in FIG. 3A is described with respect to the example application of the use of a finance tool, such as finance tool (256) of FIG. 2; however, the method shown in FIG. 3A may also be generalized to the more general use of the industry tool (126) described with respect to FIG. 1.

At step 300, an unknown vector is received from a data repository, possibly via a network, though possibly from a physical bus connecting the data repository to the local computer executing the machine learning system that processes the unknown vector. As described above, the unknown vector is a data structure populated with unknown features describing a user. At step 302, a primary MLM is executed in the manner described above to generate a score.

Figure 4:
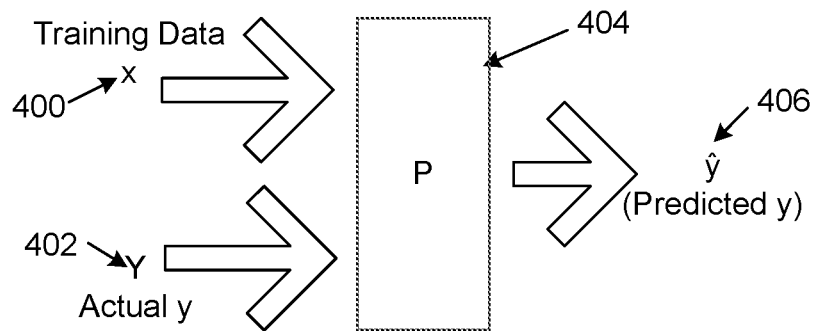
FIG. 4, FIG. 5, FIG. 6, FIG. 7, FIG. 8, FIG. 9, FIG. 10, and FIG. 11 depict aspects of machine learning model systems, in accordance with one or more embodiments.
Figure 5:
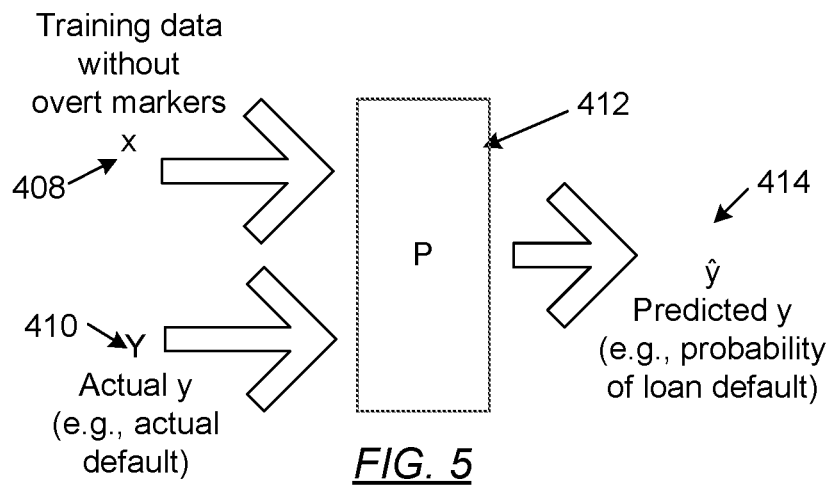

Attention is now turned to FIG. 4 and FIG. 5, which describe how to predict/generate the score using the primary MLM. In particular, FIG. 4 describes MLMs generally, and FIG. 5 describes use of an MLM in a finance application.

Turning to FIG. 4, the goal of machine learning is to use many examples of training data in the form of vector x (400) (that may be called set X) and corresponding values of vector y (402), that may be called y, to build some MLM model, that may be called P (404). The MLM model P (404) may be a deep learning MLM built such that P(X)=y for all values of vector x (400) and corresponding values of vector y (402). In other words, the MLM model P (404) classifies any of the input vectors x (400) into yes/no sets by predicting y or the probability of y. The prediction may be referred to as prediction ŷ (406).

The advantage of deriving MLM model P (404) is that MLM model P (404) may be used to predict correlations within new, previously unseen, vectors by feeding the vectors into MLM model P (404) and observing the values of prediction ŷ (406). For example, in a finance application example, a prediction may be made by MLM model P (404) whether a new borrower is likely to default or not. Using this prediction, a finance tool can decide whether or not to underwrite a loan.

The example of FIG. 4 is a simplified explanation of a classifier or a predictor in machine learning. Vector x (400) could have many features and a probability score might be chosen in the range of 0 to 1 that will offer a more nuanced interpretation of predicting the default risk. Using a range of values versus a yes/no determination is called regression. Regression may be used in a finance application of the one or more embodiments.

Additionally, a variety of learning approaches (i.e., MLMs) may be used to make predictions (i.e., prediction ŷ (406)) that as closely as possible match the actual label data y. An example of MLM model P (404), therefore, might be an artificial neural network, which is highly non-linear. However, other deep learning MLMs are contemplated, such as but not limited to deep belief networks, recurrent neural networks, supervised deep learning models, semi-supervised deep learning models, and unsupervised deep learning models.

The model described with respect to FIG. 4 presents certain challenges. First and foremost, due to the complexity and non-linear nature of a deep learning MLM, and the sizes of vectors x (400) and vector y (402) in real world applications, it is impossible for a human to interpret how the MLM model P (404) works (i.e., it is impossible to understand how MLM model P (404) arrived at prediction ŷ (406) from vector x (400)).

Stated differently, MLM model P (404) is a "black box," which can be tested to verify that the predictions of MLM model P (404) are accurate to within a known degree of accuracy, but the process by which MLM model P (404) arrived at the prediction cannot be interpreted easily. In particular, it is difficult to understand how any individual feature or features are associated with the prediction. In some cases, even computational methods cannot gauge how MLM model P (404) arrived at prediction ŷ (406) from vector x (400). The one or more embodiments address this issue.

However, under some circumstances, a programmer desires to know if the MLM P (404) is exhibiting any kind of bias in the sense of penalizing certain input vectors in a way that is unacceptable to the programmers of the function, MLM P (404). One example might be that the programmer desires to avoid the violation of fair-lending principles in a financial application of machine learning.

This potential violation might arise when the MLM model P (404) is, without the programmer's knowledge, making predictions based upon a variable such as the borrower's gender or ethnicity, even when the input data has been stripped of overt markers and known proxy markers indicative of gender or ethnicity. A first step in preventing this undesirable calculation is to remove all "negative selection"

variables from vector x (400). Negative selection variables are variables, markers, or features that are pre-determined to be overt or known proxy markers of bias.

For example, features or markers describing gender and ethnicity may be from the input variables in vector x (400) and vector y (402). However, if vector x (400) and vector y (402) are very large and encompasses many variables, it is possible that some of the variables, or combinations thereof, are acting as hidden proxies, or implicit markers, of bias.

In a highly non-linear MLM model P (404) and with very large input dimensions from vector x (400) or vector y (402), it is possible for these biases to be implied in a way that is not at all obvious by available means of inspection. For example, if vector x (400) includes data from a user's television viewing habits and eating habits, some of this data, or a non-obvious combination thereof, might indicate ethnicity. Thus, the MLM model P (404) may end up causing predictions that are unfairly biased in the sense that the outputs are being heavily influenced only by factors that indirectly indicate the negative selection variable of ethnicity.

Under these circumstances it might be possible that MLM model P (404) could be accused of being biased in an unacceptable manner. Namely, MLM model P (404) might be negatively impacting predictions due only to implied negative selection variables. In the case of lending, this fact might result in unfair lending, such as the decline of borrowers of a certain ethnicity solely because of their ethnicity, albeit via hidden (i.e., indirect) markers which were used to infer membership of the applicant in the cohort.

The goal, then, is to detect whether or not MLM model P (404) exhibits such bias and, if desirable, to gain some insight into what aspects of vector x (400) are causing P (404) to be biased. The one or more embodiments address these technical issues. The one or more embodiments also address the issue of remediating MLM model P (404) by retraining or by removing any hidden negative selection variables or markers. In other words, the one or more embodiments provide for the detection, characterization, and elimination of hidden negative selection variables that might cause MLM model P (404) from making a prediction on the basis of undesirable bias.

Returning to FIG. 3A, after executing the primary MLM to generate a score, or prediction, at step 302, then at step 304 a supervisory MLM is executed to predict whether the user belongs to a cohort against which bias is to be avoided. If not (a "no" answer at step 306), then at step 308 an action is performed using an industry tool and the score. In other words, the industry tool takes the score as input and then, possibly based on other input, outputs a computer-implemented action. The action could be to transmit a loan application, as described with respect to FIG. 3B, to draw a conclusion regarding a correlation between cause and effect in a medical research application, or some other application. In any case, the method of FIG. 3A terminates after step 308.

Figure 6:
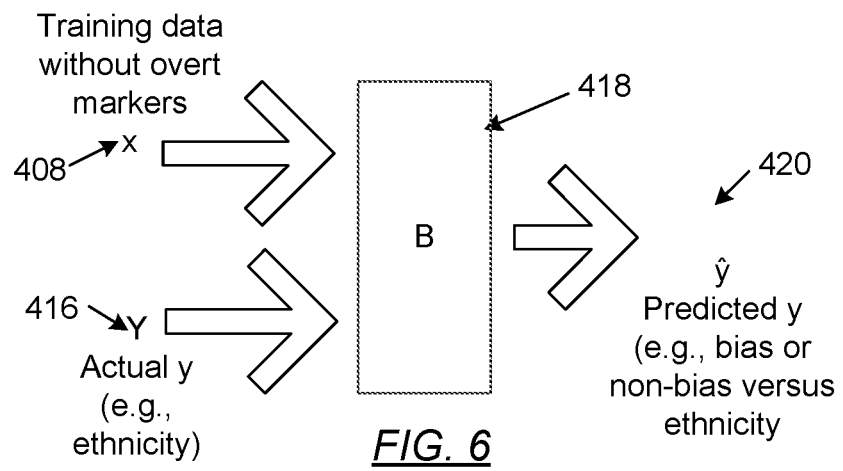

Attention is now turned to FIG. 5 and FIG. 6 with respect to describing how the supervisory MLM might converge on the cohort at step 306 of FIG. 3A in the context of a finance application. In this case, the industry tool at step 308 is a finance tool, such as finance tool (256) of FIG. 2. Again, reference numerals in common among FIG. 4 through FIG. 11 refer to similar objects and have similar descriptions.

FIG. 5 is a reproduction of FIG. 4; however, the vectors and MLM output are described in the context of a finance application. Thus, vector x (408) is the training data which has been stripped of overt or known proxy markers that constitute negative selection variables. Vector y (410) is the vector which describes the loan applicant, including information provided by the applicant as well as other types of information, such as but not limited to information in a credit report obtained on the applicant. MLM P (412) is the primary MLM which calculates the predicted probability that the applicant will default on the loan, prediction ŷ (414). The MLM model P (412) is, in this example, a type of deep learning network known as a neural network.

FIG. 6, on the other hand, represents a supervisory MLM that is used to determine a prediction that the same input data provided to the primary MLM might contain hidden negative selection variables or markers. Thus, vector x (408) is the same vector x (408) used in FIG. 5. However, this time, vector y (416) includes overt negative selection variables or markers. In this specific example, vector y (416) includes overt markers which describe the ethnicity or race of an applicant. The ethnicity or race is the cohort: the group against which bias is to be avoided.

Thus, MLM model B (418) is trained using input vector x (408) and vector y (416) to generate as output prediction ŷ (420). Prediction ŷ (420) is a prediction regarding whether the applicant belongs to the cohort (i.e., the ethnicity or race).

Stated differently, MLM model B (418) uses the same dataset as MLM P (412), but the data are targeted to train on the labels that indicate the membership of a protected class (e.g. ethnic minority), or not, by using the overt markers. For example, the MLM model B (418) is trained to identify ethnicity or race. Note that these negative selection markers or variables (ethnicity or race) were explicitly excluded from vector x (408). After training the MLM model B (418), the MLM model B (418) can predict the ethnicity of the borrower purely by observing x (that does not contain the overt markers).

Two MLM models have now been trained. MLM P (412) is the primary model that performs some predictive function (based upon classification). Parallel MLM model B (418) is trained using the same data, but is programmed to classify the input vectors into classes that relate to bias, such as the ethnicity of the applicant.

If MLM model B (418) is able to classify samples within a sufficient degree of accuracy (or loss rate), then this fact indicates that negative selection criteria exists within the input vector x (408) somewhere (i.e., there is something implicit, one or more hidden proxy markers, in the input vector that is sufficient for a machine learning algorithm (instantiated as MLM model B (418)) to reconstruct the overt markers that had been removed from vector x (408). It may then be assumed that one, or a combination, of features or markers in the input vector exist such that the MLM model (418) can infer ethnicity. Examples of such hidden negative selection features or markers might be a borrower's eating and shopping habits in some combination.

If the MLM model B (420) failed to converge with sufficient accuracy (i.e., MLM model B (420) could not really tell the ethnicity of any borrower), then it may be inferred that hidden negative features or markers do not exist in the vector x (408). Accordingly, it may be likewise inferred that the MLM P (412) is not biased in the undesirable matter. Thus, the prediction ŷ (414) of the MLM P (412) can be trusted as being unbiased against the cohort, and used in future applications (i.e., used as input to the finance tool).

However, if the MLM model B (418) does converge on a prediction ŷN (420) that the applicant belongs to the cohort, then the MLM P (412) should be tested to determine whether the MLM P (412) is indeed biased (as described with respect to step 321 of FIG. 3B).

Otherwise, if no such correlation exists, then the MLM P (412) may be determined to be unbiased, even if the supervisory MLM (MLM model B (418)) converged on the cohort. If the MLM P (412) is unbiased, even with the convergence of MLM model B (418), then the prediction of MLM P (412) may still be provided as input to the finance tool.

Nevertheless, even if the primary MLM P (412) is determined to be biased against the cohort, the primary MLM P (412) may be remediated. Remediation of the primary MLM P (412) is described further with respect to FIG. 3B and FIG. 7 through FIG. 11.

Returning to FIG. 3A, if the supervisory MLM converges on the cohort at step 306, then the method of FIG. 3A may terminate. In other words, if the primary MLM P (412) is suspected of being biased against the cohort, then the prediction of MLM P (412) may not be provided to the finance tool. Instead, the finance tool might use other input to determine whether the loan should be offered to the applicant, or perhaps a human will be tasked with completing processing of the loan application by the applicant.

Nevertheless, optionally, at step 310, the primary MLM may be remediated. The remediated MLM is not biased against the cohort. Then, at step 312, the remediated MLM may be executed to determine a new score that predicts whether the applicant will default on the loan. Thereafter, at step 314, the computer implemented action may be performed using the new industry tool using the new score as input. The method of FIG. 3A may terminate thereafter.

The details of steps 310, 312, and 314 are described further below with respect to FIG. 3B, steps 323 and 325. Additional details regarding these steps are described with respect to FIG. 7 through FIG. 11.

Attention is now turned to FIG. 3B, which may be characterized as a method of transmitting an electronic loan offer to a user. The method of FIG. 3B is a variation of the method described with respect to FIG. 3A. Step 301 through step 313 of FIG. 3B describe similar steps as described with respect to FIG. 3A, but also add the steps used in the training of the primary and supervisory MLM models. Reference is made to FIG. 4 through FIG. 6 with respect to technical details regarding how to perform step 301 through step 313. The method of FIG. 3B is an example of the one or more embodiments applied to a finance application.

At step 301, training data is received from a data repository, possibly via a network, though possibly from a physical bus connecting the data repository to the local computer executing the machine learning system that processes the training data. Again, the training data is one or more vectors containing features and markers that describe many different individuals and information regarding whether those individuals defaulted on one or more loans. At step 303, the training data is stripped of overt and known proxy markers corresponding to a cohort against which bias is to be avoided. The result of stripping the overt and known proxy markers is modified training data, which also is a vector data structure that is a subset of the original markers in the initial training data.

At step 305, the primary MLM is trained with the modified training data. Likewise, at step 307, the supervisory MLM is trained with the modified training data. Training the primary and supervisory MLMs, like training any MLM, is the process of creating a candidate model, then testing it with some held-back data, until a final model is selected for use. Together, the primary MLM and the supervisory MLM form part or all of a machine learning system, such as machine learning system 200 of FIG. 2. At this point, the machine learning system is ready to both make predictions of loan default for new loan applicants using the primary MLM, and also to ensure, using the supervisory MLM, that the primary MLM is not biased against the cohort.

Thus, at step 309, a prediction data set, that described a user, is received from a data repository, possibly via a network, though possibly from a physical bus connecting the data repository to the local computer executing the machine learning system that processes the prediction data set. The user is a loan applicant in this example. The prediction data set has been stripped of any such overt or known proxy markers or features.

Then, at step 311, the primary MLM is executed by the machine learning system using the prediction data set to predict a score. In this example, the score is a prediction that the user will default on a loan, or is a prediction that the user will pay back a loan that is offered. In either case, the score may be referred-to as a "credit worthiness score." At step 313, possibly in tandem with step 311, the supervisory MLM is executed using the prediction data set. Operation of the supervisory MLM is described with respect to FIG. 3A.

At step 315, a determination is made by the machine learning system whether the supervisory MLM converges on the cohort. If not (a "no" answer at step 315), then at step 317 the credit worthiness score is input into a finance tool. Transmission of the score to the finance tool may be via a network, though possibly from a physical bus. If the credit worthiness score exceeds a pre-selected threshold, then at step 319 an electronic loan offer is transmitted to the user using the finance tool. The finance tool used the credit worthiness score to decide to transmit the electronic loan offer to the user.

Returning to step 315, if the supervisory MLM did converge on the cohort (a "yes" answer at step 315), then at step 321 a determination by the machine learning system is made whether the primary MLM is biased against the cohort. Referring again to FIG. 4 through FIG. 6, the determination of whether the MLM P (412) is biased can be performed by correlating the predictions of the MLM P (412) with the original overt markers, vector y (416), that had been stripped from vector x (408). For example, if a strong correlation exists between loans being declined (i.e. the prediction of MLM P (412) of default is high) and membership of a minority ethnic group (i.e. the cohort), then an inference is made that the MLM P (412) is exhibiting the sort of bias against the cohort that is to be prevented.

If, at step 321, the primary MLM is not biased against the cohort (a "no" answer at step 321), then the method returns to step 317 and continues as described above. However, if the primary MLM is biased against the cohort (a "yes" answer at step 321), then the method proceeds to step 323. At step 323, the hidden proxy markers or features are characterized.

Attention is now turned to FIG. 7 through FIG. 11, which describe the steps of characterizing the hidden proxy markers or features. Again, reference numerals in common among FIG. 4 through FIG. 11 refer to similar objects and have similar descriptions.

One method of identifying the combination of variables that enable primary MLM P (412) in FIG. 4 to discriminate a negative selection criterion (i.e., the cohort) is to build an additional MLM network. In summary, the additional MLM network is provided with arbitrary (i.e., fake) input vector z that will attempt to product new "fake" vectors x that mimic the negatively-selected input vectors in the original data set X. A new vector space Z is produced that contains these generator vectors z such that vector arithmetic on the z vectors is performed to subtract a negatively-selected generator z-neg from a non-negatively selected generator z-maj to generate a new vector z-diff. The difference can be used to generate a new vector x that will only contain residual data that is attributable to negative selection. Generation of such a difference vector space is described with respect to FIG. 7 through FIG. 10.

Figure 7:
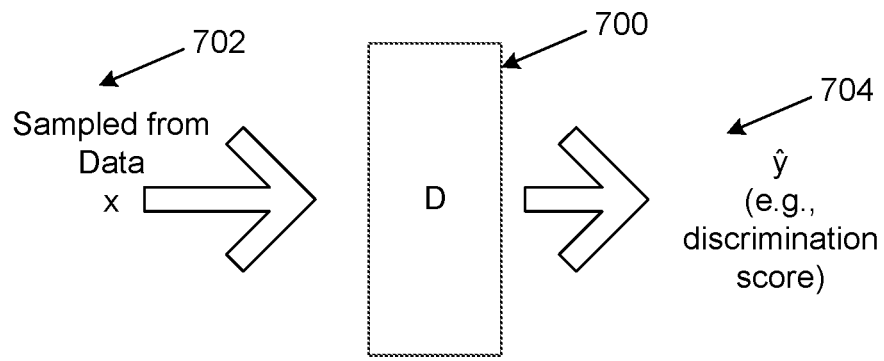

Turning to FIG. 7, a third MLM in the machine learning system (such as machine learning system 200 of FIG. 2) is characterized as a discriminator MLM D (700). Discriminator MLM D (700) is a machine learning model trained to predict a discrimination score (704) that signifies if an input vector x (702) is a real member of the set X (vector 408 of FIG. 4). In other words, when an attempt is made to add "fake" input vectors x (702) to the set of all vectors X, discriminator MLM D (700) is trained to predict if the input vector x (702) is fake or not.

In the case of loan applications, discriminator MLM D (700) is trained to predict if a particular candidate vector x is real or fake. The term "fake" means mean that the input vector x (702) that did not come from the real world but one that was deliberately fabricated to look like a real loan applicant. The fake input vector x (702) could be composed of entirely fake markers, but could also contain a combination of real and fake markers. In any case, the real vectors are sampled from the real world of loan applications, whereas the fake vectors are made up. Generation of the fake vectors may be performed manually, or by a fourth MLM, such as generator MLM G (800) of FIG. 8.

In one or more embodiments, discriminator MLM D (700) is some kind of differentiable function, meaning that it can be trained via a method like gradient descent to discriminate fake data from real data. An example of solving a differential function might be using an artificial neural network.

Figure 8:
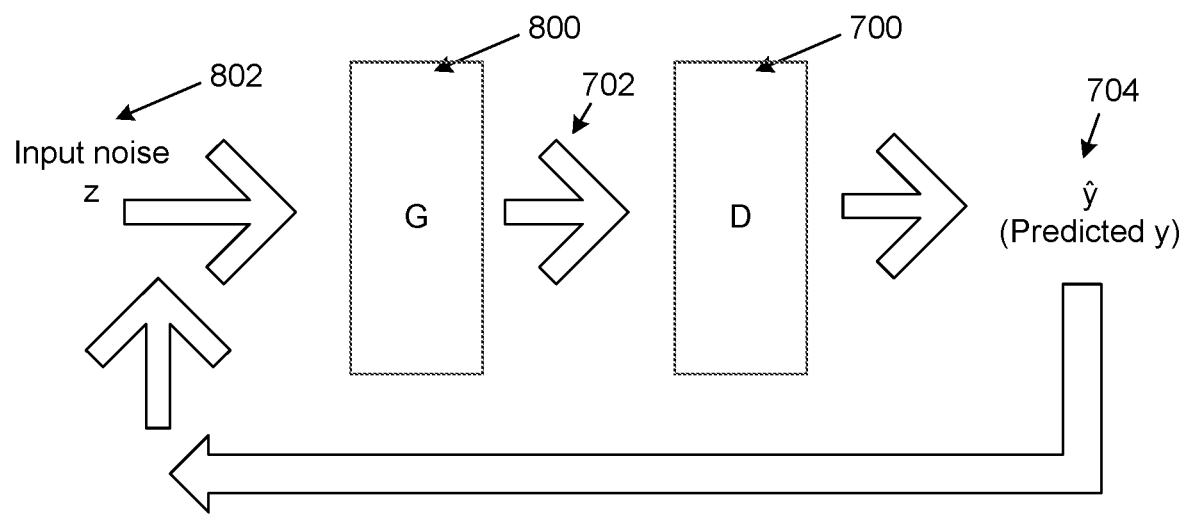

Tuning to FIG. 8, generator MLM G (800) is trained to generate fake values of vector x (702) from input noise vector z (802). The input noise vector z (802) may be manually determined, randomly determined, or may be the output of another MLM.

In one or more embodiments, generator MLM G (800) should produce high quality fake data. "High quality" means that the fake data is difficult to detect as a fake by some other machine learning process. In order to train G to produce high quality fake data, the discriminator MLM D (700) may be used to receive input vectors from generator MLM G (800). In other words, the discriminator MLM (700) attempts to predict whether the output of the generator MLM G (800) is fake. If the probability of a vector output by generator MLM G (800) being real is near to 1, then the vector output is considered a "high quality" fake. If the probability is near to 0, then a vector output is considered a "bad" fake.

In turn, the output from discriminator MLM D (700) can be fed back to generator MLM G (800). In this manner, generator MLM G (800) is optimized to produce better and better fakes. These improved fakes are then sent back to discriminator MLM D (700) repeatedly.

Thus, generator MLM G (800) and discriminator MLM D (700) are in an adversarial relationship because, in effect, G is trying to trick (or defeat) D via an adverse (fake) input that looks real. However, at the same time, D is allowed to re-train using the fake data to ensure that such fake samples are indeed detected (i.e. classified with a low probability of being real). Thus, generator MLM G (800) is constantly trying to generate fakes while discriminator MLM D (700) is trying to detect them while also improving its ability to detect more convincing fakes. Based upon the feedback received from discriminator MLM D (700), the generator MLM G (800) converges upon an input value of vector z (802) that generates a successful fake output x (702) that can fool discriminator MLM D (700). Expressed more succinctly, D tries to make $D(G(z))$ near to 0, while G tries to make $D(G(z))$ near to 1. In the case of trying to generate fake values of vector z (802), the application of the adversarial-generator network shown in FIG. 8 is to generate examples of fake data (predicted $\hat{y}$ (704)) for each of the classes that the original supervisory MLM B (416) of FIG. 6 was able to classify.

Figure 9:
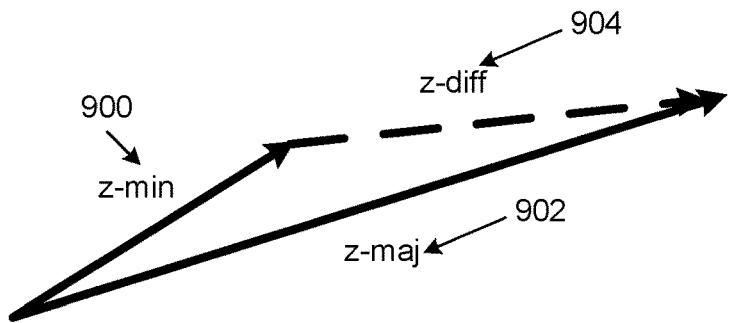

Turning to FIG. 9, in the case of ethnicity or some other cohort, the result of the adversarial network is fake examples of vector z (802), named z-min (900) for each of the minority ethnic classes in the set. However, there will also be fake examples of vector z (802), named z-maj (902), that represent the majority ethnic class.

Any given vector Z (802) may be thought of as a set of latent variables that describe what will be seen in the x vector, which in this example is a set of features describing a loan applicant. It is possible to take z vectors corresponding to a majority ethnicity applicant (z-maj 902) and subtract (using vector subtraction) z vectors corresponding to minority ethnicity applicants (z-min 900) and end up with a difference vector, z-diff (904). In the latent space, z-diff (904) represents what makes the difference between a majority and minority ethnicity applicant (i.e., the difference between non-members of the cohort and members of the cohort).

Figure 10:
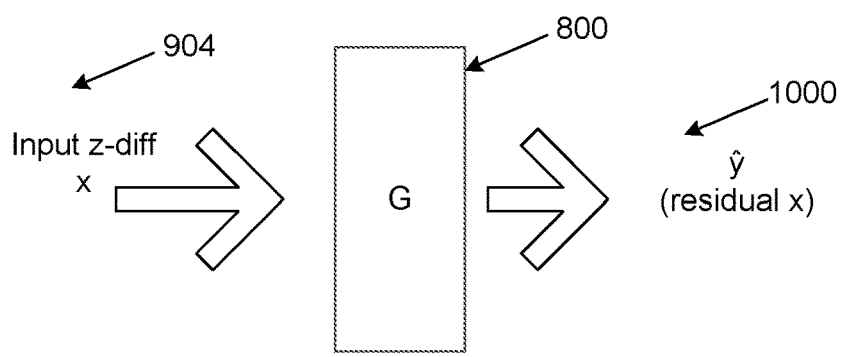

Turning to FIG. 10, after calculating z-diff (904), the generator MLM G (800) can receive z-diff (904) as input in order to map the z-diff (904) vectors back to the x-vector space of the input vectors x (702). The result is residual x vectors (1000) as the predicted output $\hat{y}$. The new residual x vectors (1000) represent the differences, or residuals, between majority and minority applicants in terms of their original features in the input vectors x (702).

By sampling the residuals in x-vector space, a probability distribution function (i.e., statistical profile (248) of FIG. 2) may be constructed in the x-vector space. The probability distribution function corresponds to probabilities of certain features being significant, or not, in determining hidden bias against the cohort. For example, a meaningful probability distribution might be found around features related to the eating habits of the applicants. The probability distribution around eating habits would indicate that the eating habits feature is a potential contributory factor in enabling the primary MLM P (412) of FIG. 4 to exhibit bias against the cohort. Stated differently, the residual x vectors (1000) can be used to characterize the hidden proxy markers or hidden proxy features which cause the primary MLM P (412) of FIG. 4 to make determinations of credit worthiness on the basis of a loan applicant's membership in the cohort.

Returning to FIG. 3B, after characterizing the hidden proxy markers or features at step 323, then at step 325 the primary MLM is remediated. Attention is now turned to the details of remediating the primary MLM P (412) to be free of undesirable bias against a cohort, and in particular attention is turned to FIG. 11.

Once the residual vectors x (1000) have been identified, along with the probability distribution functions of the features potentially causing bias against the cohort, the primary MLM P (412) can be remediated. In one embodiment, the vector space of the input vector x (408) can be stripped of the hidden markers identified by the above techniques. An example might be noticing in the residual vectors x (1000) that subscription to religious programs in an on-demand media service is contributing towards bias against an ethnic group. This data could be selectively removed without having to remove all on-demand media vectors whose wholesale removal might compromise the effectiveness of the original primary MLM P (412).

Figure 11:
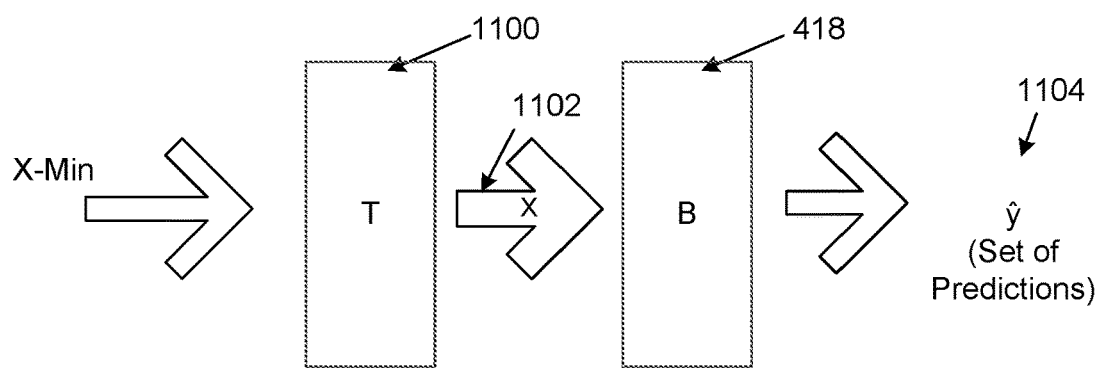

Another method, shown in FIG. 11, is to apply transforms to the contributory probability distributions and use the transform-modified vectors to see if the supervisory MLM B (418) can no longer identify bias. In particular, a fifth MLM, transform MLM T (1100), transforms the prediction data set represented by vector x (408) into a transformed vector x (1102). When the transformed vector x (1102) is input into supervisory MLM B (418), then supervisory MLM B (418) converges upon a set of predictions (1104) with a uniform probability distribution function across the output classes. In other words, when the transform vector x (1102) is provided to the supervisory MLM B (418), then the supervisory MLM B (418) will not converge on the cohort against which bias is to be avoided. The transform vector x (1102) may then be provided as input to the primary MLM (412) to predict credit worthiness or other prediction of interest.

Note that transform MLM T (1100) only affects the features or markers of vector x (408) that were identified as potentially being negative selection features or marker. Thus, transform MLM T (1100) may be described as a "de-biasing" transform that can "neutralize" any original vector x (408) so as to remove bias-contributing features or markers without compromising features useful to predicting the credit worthiness score by the primary MLM P (412).

Additionally, the primary MLM P (412) can now be retrained using the transformed vector x (1102), or the set of all such vectors, X. Thus, the primary MLM P (412) is remediated, meaning that the primary MLM P (412) can no longer make predictions of credit worthiness on the basis of the applicant being a member of the cohort against which bias is to be avoided. Likewise, along with the overt features and markers indicative of the cohort, the hidden proxy features and vectors characterized in the residual vector x (1000) can be removed from the unknown vector received for a new loan applicant. In this manner, bias against the cohort by the primary MLM P (412) can be avoided.

One method of training transform MLM T (1100) is as just described (i.e., using the residual vector x (1000)). However, another method of training transform MLM T (1100) is to formally encode the decisions of a human operative into the transform MLM T (1100). In other words, if a human declares that a certain feature of vector x (408) should be removed, then the transform MLM T (1100) can be constructed that assigns the corresponding features or markers of the vector to zero (or any arbitrary constant) for all values of x.

Returning back to FIG. 3B, after remediating the primary MLM at step 325, then at step 327 the remediated MLM is executed and a new credit worthiness score is determined. At step 329, the new credit worthiness score is input into the finance tool. The method of FIG. 3B then returns to step 319 in which an electronic loan offer is transmitted to the user using the finance tool, though in this case the finance tool used the new credit worthiness score to decide to transmit the electronic loan offer. The method of FIG. 3B may terminate thereafter.

Figure 12A:
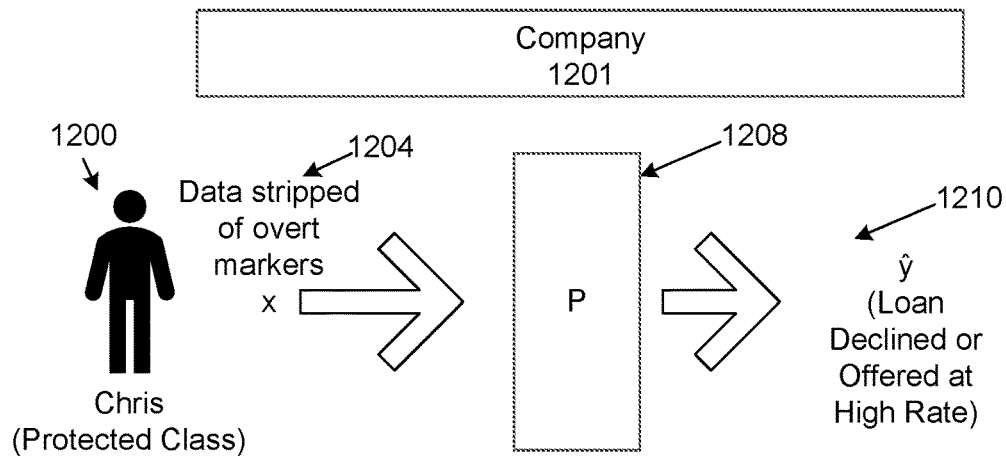
FIG. 12A, FIG. 12B, and FIG. 13 depict use case examples, in accordance with one or more embodiments.
Figure 12B:
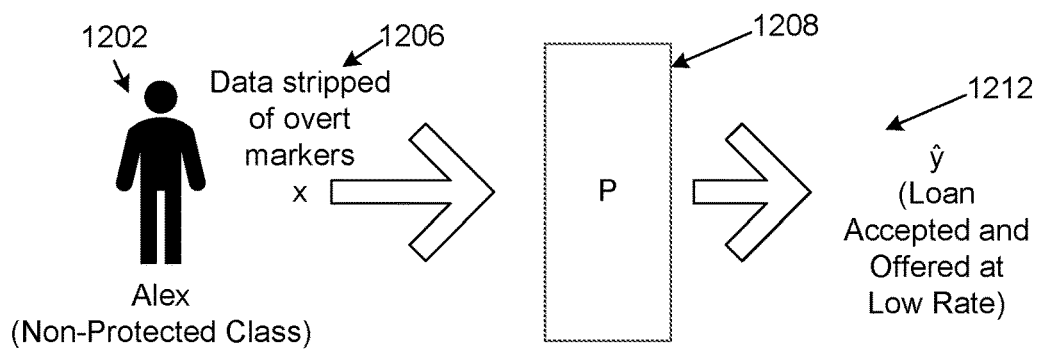

Attention is now turned to FIG. 12A and FIG. 12B, which depict use case examples of using machine learning models (MLMs) to automatically determine whether to offer a loan to a user, and if so, at what interest rate the loan will be offered. In the example shown in FIG. 12A, Chris (1200) belongs to a protected class (i.e., a cohort) against which bias is to be avoided. For example, Chris (1200) might belong to an ethnic, religious, gender, or other classification against which bias in lending is forbidden by law. In contrast, in the example shown in FIG. 12B, Alex (1202) belongs to a non-protected class. Thus, Alex (1202) does not belong to any of the protected classes.

In both cases, the input data being fed to the machine learning models is stripped of overt markers and overt features that directly tie the respective user to the protected classes. Thus, for example, input data (1204), describing Chris (1200), is stripped of overt markers indicating that Chris (1200) belongs to the protected class, or to any protected class. Likewise, input data (1206), describing Alex (1202), is stripped of overt markers indicating that Alex (1202) belongs to the non-protected class, or to any protected class.

In both cases, the respective data is fed to the MLM. Thus, the input data (1204) describing Chris (1200), who is an actual member of the protected class, is fed as input to MLM model P (1208). Likewise, the input data (1206) describing Alex (1202), who is not a member of the protected class, is fed as input to MLM model P (1208).

In the example shown, in FIG. 12A, the MLM model P (1208) predicts, as output $\hat{y}$ (1210), that Chris (1200) should have the loan application declined. Alternatively, the MLM model P (1208) predicts, as output $\hat{y}$ (1210), that Chris (1200) should be offered a loan, but at a high rate of interest, such as 18%. However, in FIG. 12B, the MLM model P (1208) predicts, as output $\hat{y}$ (1212), that the loan application should be accepted and that Alex (1202) should offered a low interest rate.

As a matter of technological fact, it is impossible to know whether the MLM model P (1208) produced the output $\hat{y}$ (1210) and the output $\hat{y}$ (1212) using hidden correlations among the data (1204) or the data (1206). The hidden correlations may indicate that Alex (1200) belongs to the protected class, or that Chris (1202) belongs to the non-protected class. Thus, the possibility exists that the MLM model P (1208) predicted the output $\hat{y}$ (1210) and the output $\hat{y}$ (1212) purely on the basis of either (i) Chris (1200) is in the protected class, or (ii) Alex (1202) is in the non-protected class. In either case, the decision to offer or decline the loan, or to offer the same loan at different interest rates, purely on the basis of membership or non-membership in the protected class, would be unacceptable.

Note that the company (1201) using the MLM model P (1208) does not actually know whether unacceptable bias has been used in the loan offer. It is also possible that the decision by the MLM model P (1208) to decline a loan to the user (1200) in the protected class, or to offer the user (1200) a loan with a higher interest rate, was legitimate. In other words, the MLM model P (1208) could have made the prediction of output $\hat{y}$ (1210) without any reference, hidden or otherwise, to the membership of the user (1200) in the protected class. Accordingly, it is also possible that the output $\hat{y}$ (1210) and the output $\hat{y}$ (1212) are legitimately determined and should be used.

Figure 13:
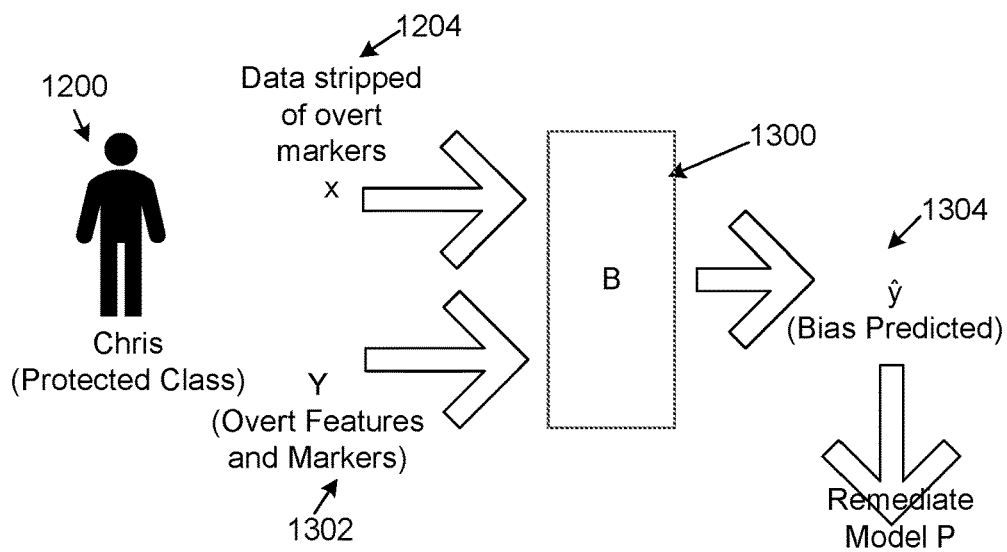

Therefore, turning to FIG. 13, the company (1201) seeks technological assurance that the MLM model P (1208) made the predictions of output $\hat{y}$ (1210) and of output $\hat{y}$ (1212) without bias against the protected class. To do so, the company (1201) uses a different machine learning model, MLM model B (1300), which is trained to predict whether Chris (1200) belongs to the protected class. Training of the MLM model B (1300) is accomplished by using overt features and markers Y (1302). The overt features and markers (1302) could be specific markers which obviously could be used to determine that Chris (1200) is a member of the protected class, up to and including an actual description of Chris (1200) being a member of the protected class.

After training, the same stripped data used to describe Chris (1200), that is the input data (1204), is input to the MLM B (1300). If the output ŷ (1304) successfully predicts that Chris (1200) is a member of the protected class, then the company (1201) may assume that some hidden bias against the protected class exists when the MLM model P (1208) produces the output ŷ (1210) on the basis of the data stripped of overt markers (i.e., the input data (1204). On the other hand, if the output ŷ (1304) does not converge on a protected class, that is if the output ŷ (1304) does not indicate that Chris (1200) is in a protected class, then the output ŷ (1210) of FIG. 12A is not produced on the basis of unacceptable bias. Accordingly, when the output ŷ (1304) does not converge on a protected class, the decision that the loan be declined or that the loan be offered at a higher rate will be allowed to stand. The original loan offer, or transmission that the loan was declined, will then be transmitted to Chris (1200).

However, again, if the output ŷ (1304) converges on a protected class, then steps are taken to remediate the MLM model P (1208). Remediation may take a number of different forms. For example, as explained with respect to FIG. 7 and FIG. 8, the markers or features used to establish the hidden correlations which allows the MLM model P (1208) to decide on the basis of membership in a protected class may be removed. Once identified through the combined use of a discriminator MLM (see FIG. 7 and FIG. 8) and a generator MLM (see FIG. 8), together with vector mathematics (see FIG. 9), the identified variables may be removed from the input data (1204). The revised input data is then used to re-train the MLM model P (1208), which then makes a new prediction that is free of the unacceptable bias.

Alternatively, a transform MLM model (see FIG. 11) may be used to automatically transform the input vector (1204) until, when the revised vector is input to the MLM model B (1300), the MLM model B (1300) can no longer converge on the protected class. This remediated vector is then used to re-train MLM model P (1208), which then makes a new prediction that is free of the unacceptable bias against the protected class.

As a still different alternative, if the MLM model B (1300) predicts bias by the MLM model P (1200) against the protected class, then the loan decision can be made by a person instead of automatically by a machine learning model executed by a computer. The person can then ensure that any loan decision, or interest rate decision, is made without reference to the protected class against which bias is to be avoided.

The features used with respect to the one or more embodiments may include many different kinds of information. Specific kinds of information include information from a credit report, such as credit score, number of credit cards, etc. Other specific kinds of information may be publicly available or searchable, such as what kinds of NETFLIX® programs the user watches, user car brand ownership, user music taste, user food preferences, etc. Overt features are features that directly indicate whether or not the user belongs to a protected class (i.e., a cohort). Examples of overt markers include race (e.g., that Chris (1200) is African-American or that Alex (1202) is Caucasian), gender, religious preference, etc.

Note that the examples described with respect to FIG. 12A through FIG. 13 are not limited to simply offering loans to users. For example, it may be desirable to avoid bias in marketing or advertising loans or other kinds of products to users. It may be desirable to avoid bias in reaching a conclusion that is known to be unacceptable in scientific research. Thus, the examples described with respect to FIG. 12A through FIG. 13 do not necessarily limit the other examples provided herein.

Figure 14A:
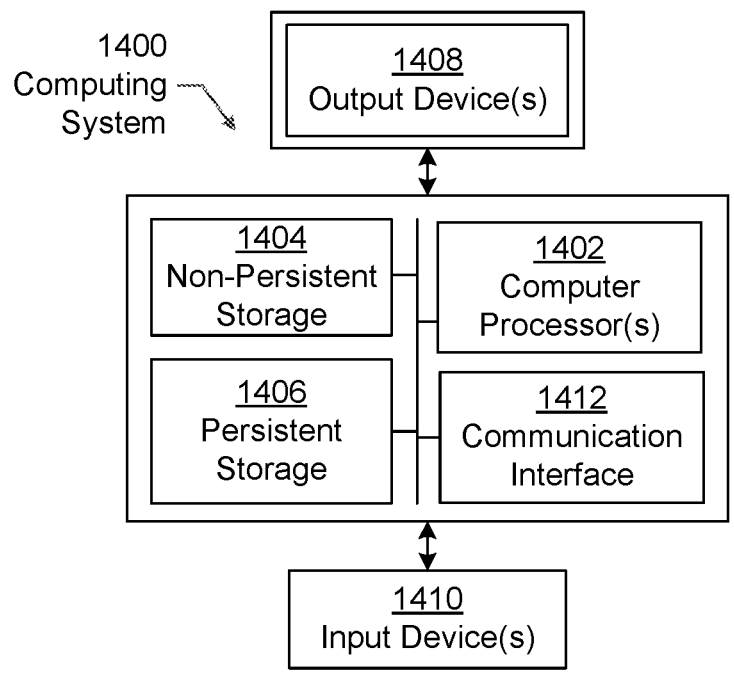
FIG. 14A and FIG. 14B depict a computer system and network in accordance with one or more embodiments

Embodiments of the invention may be implemented on a computing system. Any combination of mobile, desktop, server, router, switch, embedded device, or other types of hardware may be used. For example, as shown in FIG. 14A, the computing system (1400) may include one or more computer processors (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities.

The computer processor(s) (1402) may be an integrated circuit for processing instructions. For example, the computer processor(s) may be one or more cores or micro-cores of a processor. The computing system (1400) may also include one or more input devices (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output devices (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 14B:
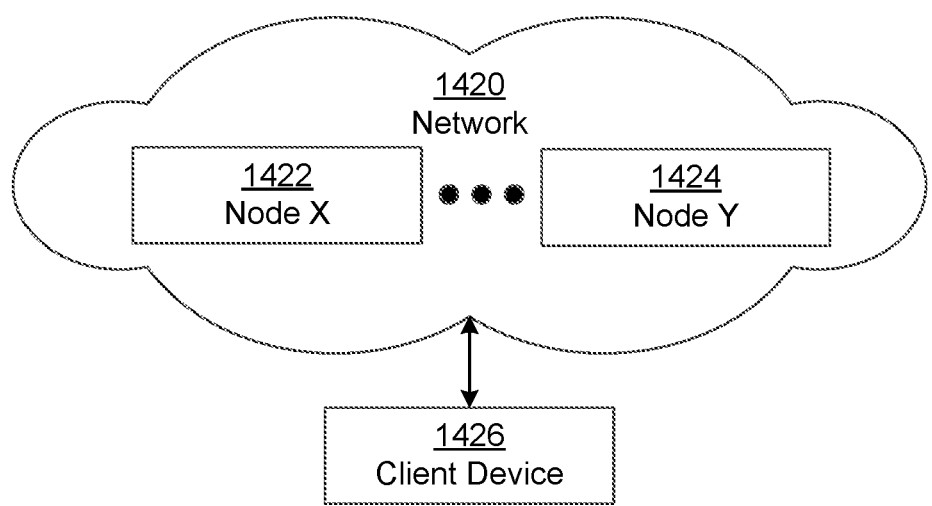

The computing system (1400) in FIG. 14A may be connected to or be a part of a network. For example, as shown in FIG. 14B, the network (1420) may include multiple nodes (e.g., node X (1422), node Y (1424)). Each node may correspond to a computing system, such as the computing system shown in FIG. 14A, or a group of nodes combined may correspond to the computing system shown in FIG. 14A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1400) may be located at a remote location and connected to the other elements over a network.

Although not shown in FIG. 14B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1422), node Y (1424)) in the network (1420) may be configured to provide services for a client device (1426). For example, the nodes may be part of a cloud computing system. The nodes may include functionality to receive requests from the client device (1426) and transmit responses to the client device (1426). The client device (1426) may be a computing system, such as the computing system shown in FIG. 14A. Further, the client device (1426) may include and/or perform all or a portion of one or more embodiments of the invention.

The computing system or group of computing systems described in FIGS. 14A and 14B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 14A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 14A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 14A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 14A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 14A and the nodes and/or client device in FIG. 14B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a computer processor;
a non-transitory computer readable storage medium in communication with the computer processor and storing:
training data, wherein the training data comprises a plurality of features arranged as a first vector for input into a primary machine learning model (MLM) and a supervisory MLM, the plurality of features corresponding to information describing a plurality of users, and
a biased data set, wherein the biased data set comprises a subset of the plurality of features belonging to a cohort against which bias is to be avoided, the subset of the plurality of features including markers useable by the primary MLM to make a prediction of credit worthiness, of a user of the plurality of users who belongs to the cohort, on a basis of bias against the cohort;
a stripping utility which, when executed by the computer processor, is configured to strip the biased data set from the training data to form a first modified training data;
the primary MLM, stored on the non-transitory computer readable storage medium, and trained with the first modified training data to predict credit worthiness scores of the plurality of users;
a supervisory MLM, stored on the non-transitory computer readable storage medium, and trained with the first modified training data to predict which of the plurality of users belongs to the cohort;
a transform MLM, stored on the non-transitory computer readable storage medium, and trained, responsive to the supervisory MLM predicting at least some of the plurality of users belong to the cohort, to transform the first modified training data into a remediated data vector; and
a machine learning system which, when executed by the computer processor, is configured to re-train the primary MLM using the remediated data vector.

2. The system of claim 1 comprising:
a finance tool configured to transmit a loan offer to the user when both a first credit worthiness score of the user exceeds a threshold and also the supervisory MLM fails to converge on the cohort, wherein the loan offer comprises a widget operable by the user using a computer.

3. The system of claim 1 further comprising:
a plurality of additional MLMs trained to produce a residual vector containing only residual data in the first modified training data that, when input to the supervisory MLM, causes the supervisory MLM to converge on the cohort;
wherein the stripping utility is further configured to strip the residual data from the first modified training data as part of forming the remediated data vector.

4. The system of claim 3 wherein the plurality of additional MLMs comprises:
a discriminator MLM trained to predict whether an input vector "x" corresponds to real data or fake vector; and
a generator MLM trained to generate a fake vector;
wherein the generator MLM and the discriminator MLM are programmed to oppose each other until the generator MLM creates a fake vector output, but which the discriminator MLM predicts is real.

5. The system of claim 4 wherein the fake vector output comprises a first plurality of vectors corresponding to the cohort, represented by "z-min", and a second plurality of vectors not corresponding to the cohort, represented by "z-maj", and wherein the system further comprises:
a difference utility configured to subtract z-min from z-maj to create a third plurality of vectors, represented by "z-diff".

6. The system of claim 5 wherein:
the generator MLM is further configured to map z-diff to the first vector using the generator MLM to generate the residual data between the cohort and users not in the cohort;
the difference utility is further configured to sample the residual data to reconstruct a probability function that corresponds to probabilities of particular features within the first vector resulting in hidden bias when the primary MLM is executed using the first vector as input; and
the stripping utility is further configured to strip the particular features from the first vector.

7. The system of claim 5 wherein:
the generator MLM is further configured to map z-diff to the first vector using the generator MLM to generate the residual data between the cohort and users not in the cohort, the difference utility is further configured to sample the residual data to reconstruct a probability function that corresponds to probabilities of particular features within the first vector resulting in hidden bias when the primary MLM is executed using the first vector as input, the transform MLM is trained, using the probability function, to transform the first vector into a remediated data vector which, when input to the supervisory MLM, causes the supervisory MLM to fail to converge when executed by the computer processor.

8. The system of claim 1, wherein the cohort comprises at least one of a gender label, an ethic label, a racial label, a religious group label, and a medical condition.

9. A computer-implemented method, comprising:
receiving, at a computer processor, training data, wherein the training data comprises a plurality of features arranged as a first vector for input into a primary machine learning model (MLM) and a supervisory MLM, the plurality of features corresponding to information describing a plurality of users;
stripping, by the computer processor, the training data of overt markers and known proxy markers, the overt markers and known proxy markers corresponding to a cohort against which bias is to be avoided, and forming a first modified training data comprising a subset of the plurality of features;
training, by the computer processor, the primary MLM with the first modified training data to predict credit worthiness scores of the plurality of users;
training, by the computer processor, the supervisory MLM with the first modified training data to predict which of the plurality of users belong to the cohort;
receiving, by the computer processor, a prediction data set from which the overt markers and known proxy markers have been stripped, the prediction data set comprising a second vector including sample data related to a user in the plurality of users;
executing, by the computer processor, the supervisory MLM using the prediction data set to predict whether the user belongs to the cohort, wherein as a result of executing, the supervisory MLM converges on the cohort;

responsive to the supervisory MLM converging on the cohort, determining, by the computer processor, that the primary MLM is biased against the cohort;

transforming, by the computer processor executing a transform MLM and responsive to determining that the primary machine learning model is biased against the cohort, the first vector into a remediated data vector;

remediating, by the computer processor, the primary MLM to form a remediated primary MLM, wherein remediating comprises re-training the primary MLM using the remediated data vector, and wherein the remediated primary MLM can no longer make predictions on a basis of the cohort;

predicting, using the remediated primary MLM, a credit worthiness score for the user; and executing a finance tool and, responsive to the credit worthiness score exceeding a threshold, transmitting an offer to the user, the offer comprising a widget operable on a remote computer to indicate acceptance of the offer.

10. The method of claim 9 wherein remediating comprises:

training a plurality of additional MLMs to produce a residual vector containing only residual data in the first modified training data that results in the supervisory MLM, when executed, converging on the cohort;

stripping the first modified training data of the residual data to form a second modified training data; and retraining the primary MLM and the supervisory MLM using the second modified training data.

11. The method of claim 10 wherein training the plurality of additional MLMs comprises:

training a discriminator MLM to predict whether an input vector "x" corresponds to real data or fake vector; and training a generator MLM to generate fake vector;

wherein the generator MLM and the discriminator MLM are programmed to oppose each other until the generator MLM creates a fake vector output, but which the discriminator MLM predicts is real.

12. The method of claim 11 wherein the fake vector output comprises a first plurality of vectors corresponding to the cohort, represented by "z-min", and a second plurality of vectors not corresponding to the cohort, represented by "z-maj", and wherein the remediating further comprises:

subtracting z-min from z-maj to create a third plurality of vectors, represented by "z-diff".

13. The method of claim 12 wherein remediating further comprises:

mapping z-diff to the first vector using the generator MLM to generate the residual data between the cohort and users not in the cohort;

sampling the residual data to reconstruct a probability function that corresponds to probabilities of particular features within the first vector resulting in hidden bias when the primary MLM is executed using the first vector as input; and stripping the particular features from the first vector.

14. The method of claim 12 wherein remediating further comprises:

mapping z-diff to the first vector using the generator MLM to generate residual data between the cohort and users not in the cohort;

sampling the residual data to reconstruct a probability function that corresponds to probabilities of particular features within the first vector resulting in hidden bias when the primary MLM is executed using the first vector as input; and training the transform MLM, using the probability function.

15. The method of claim 10 further comprising:

highlighting the residual data; and displaying the residual data for review.

16. The method of claim 11 further comprising:

providing a plurality of additional sets of unknown features corresponding to a plurality of additional unknown users;

executing the primary MLM using the plurality of additional sets of unknown features to predict a plurality of credit worthiness scores for the plurality of additional unknown users; and using the supervisory MLM and the generator MLM to reconstruct probability distribution functions in an input vector space that correspond to probabilities of certain features being significant or insignificant in determining hidden bias, in order to generate a statistical profile that characterizes potential biases of the primary MLM against the cohort.

17. The method of claim 9, further comprising:

executing the remediated primary MLM to determine a new credit worthiness score for the user; and inputting the new credit worthiness score into a finance tool.

18. The method of claim 9, wherein the cohort comprises at least one of a gender label, an ethic label, a racial label, a religious group label, and a medical condition.

19. A method, executed using a computer, comprising:

receiving training data, wherein the training data comprises a plurality of features arranged as a first vector for input into a primary machine learning model (MLM) and a supervisory MLM, the plurality of features corresponding to information describing a plurality of users;

stripping the training data of overt markers and known proxy markers, the overt markers and known proxy markers corresponding to a cohort against which bias is to be avoided, and forming a first modified training data comprising a subset of the plurality of features;

training the primary MLM with the first modified training data to predict credit worthiness scores of the plurality of users;

training the supervisory MLM with the first modified training data to predict which of the plurality of users belong to the cohort;

receiving a prediction data set from which the overt markers and known proxy markers have been stripped, the prediction data set comprising a second vector including sample data related to a user in the plurality of users;

executing the supervisory MLM using the prediction data set to predict whether the user belongs to the cohort, wherein as a result of executing, the supervisory MLM converges on the cohort;

responsive to the supervisory MLM converging on the cohort, determining that the primary MLM is biased against the cohort;

responsive to the primary MLM being biased against the cohort, remediating the primary MLM to form a remediated primary MLM, wherein the remediated primary MLM can no longer make predictions on a basis of the cohort, wherein remediating comprises:

training a plurality of additional MLMs to produce a residual vector containing only residual data in the first modified training data that results in the supervisory MLM, when executed, converging on the cohort, wherein:

training the plurality of additional MLMs comprises training a discriminator MLM to predict whether an input vector "x" corresponds to real data or fake vector and training a generator MLM to generate fake vector, the generator MLM and the discriminator MLM are programmed to oppose each other until the generator MLM creates a fake vector output, but which the discriminator MLM predicts is real, and wherein the fake vector output comprises a first plurality of vectors corresponding to the cohort, represented by "z-min", and a second plurality of vectors not corresponding to the cohort, represented by "z-maj";

mapping z-diff to the first vector using the generator MLM to generate the residual data between the cohort and users not in the cohort;

sampling the residual data to reconstruct a probability function that corresponds to probabilities of particular features within the first vector resulting in hidden bias when the primary MLM is executed using the first vector as input;

training a transform MLM, using the probability function, to transform the first vector into a remediated data vector which, when input to the supervisory MLM, causes the supervisory MLM to fail to converge when executed; and executing the transform MLM using the first vector as input to produce the remediated data vector, wherein providing the remediated data vector as input to the primary MLM forms the remediated primary MLM.

* * * * *